United States Patent
Lin et al.

(10) Patent No.: US 8,574,948 B2
(45) Date of Patent: Nov. 5, 2013

(54) METHOD OF IMPROVING POWER CONVERSION EFFICIENCIES IN DYE-SENSITIZED SOLAR CELLS BY FACILE SURFACE TREATMENT

(75) Inventors: Zhiqun Lin, Atlanta, GA (US); Jun Wang, Lakewood, CO (US)

(73) Assignee: Iowa State University Research Foundation, Inc., Ames, IA (US)

( * ) Notice: Subject to any disclaimer, the term of this patent is extended or adjusted under 35 U.S.C. 154(b) by 266 days.

(21) Appl. No.: 13/218,624

(22) Filed: Aug. 26, 2011

(65) Prior Publication Data

US 2012/0052616 A1    Mar. 1, 2012

Related U.S. Application Data

(60) Provisional application No. 61/377,480, filed on Aug. 27, 2010.

(51) Int. Cl.
  *H01L 21/00* (2006.01)
(52) U.S. Cl.
  USPC ............................... 438/85; 438/104; 438/95
(58) Field of Classification Search
  USPC .............................................. 438/85, 95, 104
  See application file for complete search history.

(56) References Cited

U.S. PATENT DOCUMENTS 7,750,386 B2 *  7/2010  Tian et al. .................... 257/296

OTHER PUBLICATIONS

Boercker, J.E. et al., "Growth mechanism of titanium dioxide nanowires for dye-sensitized solar cells", Nanotechnology 19 (2008) 095604, 10 pages.
Leschkies, Kurtis S. et al., "Photosensitization of ZnO Nanowires with CdSe Quantum dots for Photovoltaic Devices", Nano Letters, 2007, vol. 7, No. 6, pp. 1793-1798.
Liu, Bin et al., "Growth of Oriented Single-Crystalline Rutile TiO2 Nanorods on Transparent Conducting Substrates for Dye-Sensitized Solar Cells", JACS Articles published on web Feb. 26, 2009, J. Am. Chem. Soc. 2009, 131, pp. 3985-3990.
Mor, Gopal K. et al., "Use of Highly-Ordered TiO2 Nanotube Arrays in Dye-Sensitized Solar Cells", Nano Letters, 2006, vol. 6, No. 2, pp. 215-218.
O'Regan, Brian et al., "A low-cost, high-efficiency solar cell based on dye-sensitized colloidal TiO2 films", Nature, vol. 353, Oct. 24, 1991, pp. 737-740.

* cited by examiner

*Primary Examiner* — Richard Booth
(74) *Attorney, Agent, or Firm* — McKee, Voorhees & Sease, P.L.C.

(57) ABSTRACT

Highly ordered anodic $TiO_2$ nanotube arrays fabricated by electrochemical anodization and sensitized with dye to yield dye-sensitized $TiO_2$ nanotube solar cells is described. With inorganic compound (such as $TiCl_4$) treatment, in conjunction with oxygen plasma exposure under optimized conditions, dye-sensitized $TiO_2$ nanotube solar cells produced using $TiO_2$ nanotube arrays exhibited a pronounced power conversion efficiency.

17 Claims, 8 Drawing Sheets

METHOD OF IMPROVING POWER CONVERSION EFFICIENCIES IN DYE-SENSITIZED SOLAR CELLS BY FACILE SURFACE TREATMENT

CROSS-REFERENCE TO RELATED APPLICATIONS

This application claims priority under 35 U.S.C. §119 to provisional application Ser. No. 61/377,480 filed Aug. 27, 2010, herein incorporated by reference in its entirety.

FIELD OF THE INVENTION

This invention relates to dye-sensitized solar cells, and more particularly to dye-sensitized $TiO_2$ nanotube solar cells having markedly enhanced performance as a result of optimized facile surface engineering.

BACKGROUND OF THE INVENTION

As one of the major renewable energy sources, solar energy has the potential to become an essential component of future global energy production. Dye-sensitized solar cells (DSSCs), represent one of the most promising of several alternative, cost-effective concepts for solar-to-electric energy conversion that has been offered over the past decade to challenge conventional silicon solar cells. The conventional configuration of a DSSC consists of a sintered, wide bandgap semiconductor $TiO_2$ nanoparticle network film, a ruthenium-based dye (i.e., sensitizer), and an electrolyte. Upon the absorption of photons, the dye generates excitons (i.e., electron-hole pairs). Subsequently, the electrons inject into the $TiO_2$ photoanode to generate photocurrent; scavenged by a redox couple, holes transport to the cathode. The performance of a DSSC can be improved by optimizing the semiconductor $TiO_2$ nanoparticle film, sensitizer, and electrolyte. However, much research remains to be done to improve the efficiency and remove the practical problems related to DSSCs. For example, typically, a 10-μm-thick mesoporous $TiO_2$ (anatase nanocrystals) film with a porosity of 50% is employed as an electron-accepting species in a DSSC. The film is prepared by dispersing 15-30 nm colloidal $TiO_2$ particles on a conductive glass support resulting in a network of randomly dispersed nanocrystals. While versatile and robust, these sintered three dimensional $TiO_2$ nanoparticle films lead to enhanced scattering of free electrons and electron trapping at the interfaces, thereby reducing electron mobility and exhibiting less efficient electron transport. The electron and hole transport across several ill-defined, heterogeneous interfaces in $TiO_2$ nanoparticle films is very complex.

In this context, highly ordered, vertically oriented $TiO_2$ nanotube arrays of different aspect ratios and surface qualities have recently been fabricated as alternative nanoscale architectures to substitute the sintered $TiO_2$ nanoparticle films in DSSCs. They are produced by potentiostatic anodization of titanium (Ti) foil or Ti thin films that have been sputtered using radio-frequency (RF) sputter deposition on a variety of substrates with fluorine-containing electrolytes. The nanotubular morphology of these arrays offers a large internal surface area with no concomitant decrease in geometric and structural order. The vertical orientation of the crystalline nanotube arrays makes them excellent electron percolation pathways for efficient, vectorial charge transport along the nanotube axis.

Solar cells produced from $TiO_2$ nanotube arrays show enhanced charge collection efficiency and enhanced light scattering over sintered $TiO_2$ nanoparticle films. The use of $TiO_2$ nanotubes reduces carrier scattering loss and nonradiative recombination by eliminating unnecessary lateral transport (i.e., hopping between TiO2 nanoparticles) and its resulting recombination loss.

Accordingly, it is a primary objective of the present invention to provide a surface treatment for $TiO_2$ photoanodes to increase the loading of sensitizers on the TiO2 surface and also improve the electronic interaction between the sensitizer (i.e., dye) and the TiO2 surface, thereby yielding improved performance. Thus, by using the process of the present invention, a significant step forward in the amount of dye adsorption and the charge transfer from dye molecules to photoanodes is achieved, and, ultimately, an enhanced PCE obtained.

The method of accomplishing this primary objective as well as others will become apparent from the detailed description of the invention which follows hereafter.

DETAILED DESCRIPTION OF THE PREFERRED EMBODIMENTS

Figure 1A:
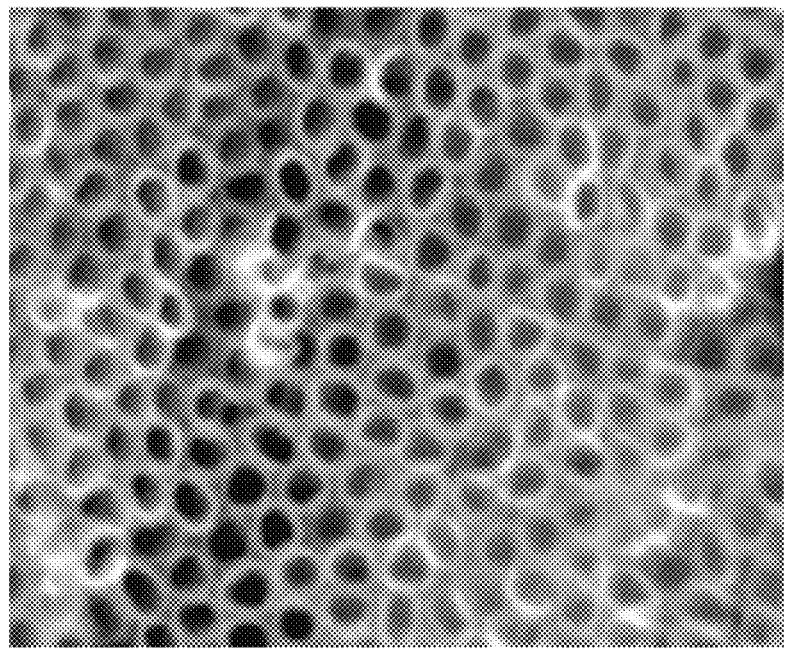
FIGS. 1(A)-(D) show the structural characterization and an intensity plot for highly ordered $TiO_2$ nanotube arrays.

It will be shown, as one method for accomplishing the primary objective of the present invention, that a dye-sensitized $TiO_2$ nanotube solar cell has enhanced performance (i.e., PCE) based on highly ordered, vertically oriented $TiO_2$ nanotube arrays after rational surface engineering (i.e., $TiCl_4$ processing followed by $O_2$ plasma exposure). According to one aspect of the invention, the $TiO_2$ nanotube arrays were fabricated by electrochemical anodization and thermally induced crystallization; subsequently, they were impregnated with ruthenium dye N-719 used as a sensitizer and chemically anchored to the surface of the $TiO_2$ nanotubes via the reaction of carboxylate moieties on the N-719 surface with complementary hydroxyl groups on the $TiO_2$ surface. Accomplishing another primary object of the present invention, the solar cell of the present invention demonstrated a significant increase in the PCE (from 4.34% to 7.37%) using 14-μm-thick $TiO_2$ nanotube arrays under simulated AM 1.5 G irradiation of 100 mW/cm² in backside illumination mode with $TiCl_4$ treatment and oxygen plasma exposure on the $TiO_2$ surface before dye loading. The $TiCl_4$ and $O_2$ plasma exposure process, according to one aspect of the invention, increased the photogenerated current and fill factor, and ultimately a higher PCE. This has previously been unable to be accomplished as evidenced by the fact that there are no reports in the technical literature to the Applicant's knowledge of a PCE of 7.37% for dye-sensitized $TiO_2$ nanotube solar cells.

Fabrication of TiO$_2$ Nanotube Arrays

In a typical fabrication of the arrays, high-purity Ti foil (250 μm thick, 99.7% purity, Sigma-Aldrich) were cut into pieces, each 1 in.×0.5 in. in size, and degreased by ultrasonication for 30 min in a mixture of acetone, methanol, and methylene chloride, followed by a thorough rinse with deionized (DI) water and blow-dried with N$_2$. Ethylene glycol (Fisher Scientific) was used as the electrolyte in which a small amount of ammonium fluoride (Sigma-Aldrich) was added. Electrochemical anodization of titanium was performed in a two-electrode cell at room temperature using a EC570-90 power source (Thermo Electron Corporation) at 60 V. A platinum foil was used as the counter electrode. After anodization, the Ti foil with TiO$_2$ nanotubes grown on one side of its surface was extensively washed with DI water and dried with N$_2$ gas (the backside of the Ti foil was protected with a layer of insulate resin to prevent oxidation during the anodization process). High temperature annealing was carried out to transform the as-prepared amorphyous TiO$_2$ nanotube into anatase nanotube.

Surface Treatment.

Prior to dye adsorption, anatase TiO$_2$ nanotubes were processed with TiCl$_4$ by immersing them in 50 mL of 0.2 M TiCl$_4$ aqueous solution in a beaker sealed with parafilm and kept in a 60° C. oil bath for 1 h, followed by rinsing with ethanol and annealed at 500° C. in air for 30 min. The TiCl$_4$-treated TiO$_2$ nanotubes were further exposed to O$_2$ plasma at 30 W of power for different times.

TiO$_2$ Nanotube Solar Cell Fabrication.

The surface-treated TiO$_2$ nanotube arrays were then immediately soaked in a 0.2 mM dye/ethanol solution for 24 h to allow complete dye adsorption. The dye used in the study was cis-diisothiocyanatobis(2,2'-bipyridyl-4,4'-dicarboxylato) ruthenium(II) bis(tetrabutylammonium) (N-719, Solaronix). A semitransparent platinum (Pt)-coated ITO glass was used as the counter electrode, prepared by placing a drop of 0.5 mM chloroplatinic acid (H$_2$PtCl$_6$)/isopropanol solution on ITO glass and subsequently fired at 380° C. for 20 min. The dye-sensitized TiO$_2$ nanotube arrays were sandwiched between the Ti foil (anode) and the Pt-coated ITO glass (cathode) by applying a 25-μm-thick hot-melt sealing foil as the spacer (SX1170-25, Solaronix). An ionic liquid electrolyte containing 0.60 MBMIM-I, 0.03MI$_2$, 0.50MTBP, and 0.10MGTCin acetonitrile/valeronitrile 85/15 (v/v) (No. ES-0004, purchased from io.li.tec, Germany) was injected between two electrodes driven by capillary force through holes on the hot-melt sealing foil. The ionic liquid possesses high thermal stability, negligible vapor pressure, and low toxicity. The backside of the Ti foil was then scratched using sandpaper to remove the thin oxide layer, thereby exposing the underlying titanium that serves as the electrode.

Characterization.

Scanning electron microscopy (SEM) imaging was performed with a JEOL Model LV 5800 microscope. Raman spectroscopy measurements were performed using a Renishaw in Via Raman microscope excited with a 488-nm Ar$^+$ laser at 5 mW with an acquisition time of 10 s. The current-voltage (I-V) curves were measured using a Keithley Model 2400 multisource meter. A solar simulator (SoLux Solar Simulator) was used to simulate sunlight, with an illumination intensity of 100 mW/cm$^2$ (calibrated with Daystar Meter). The photoactive area for all solar cells was 0.125 cm$^2$.

EXAMPLE

Figure 1B:
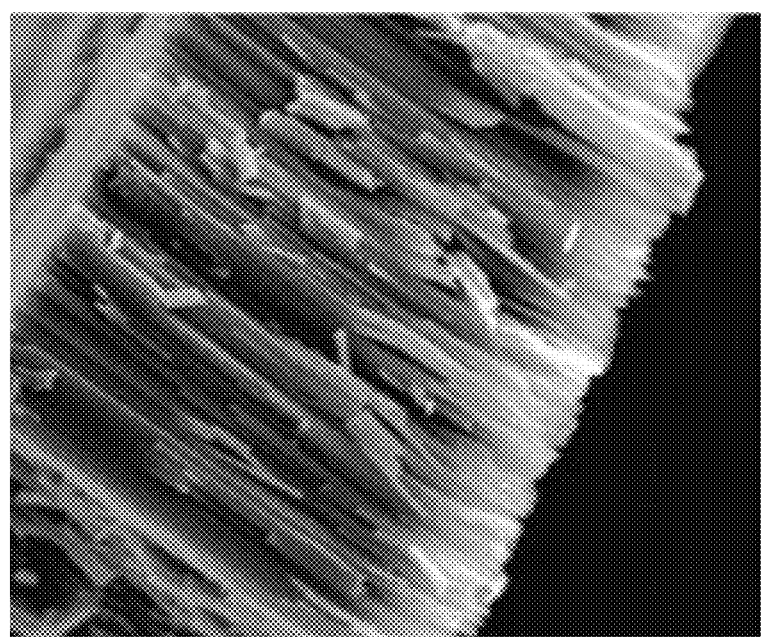
Figure 1C:
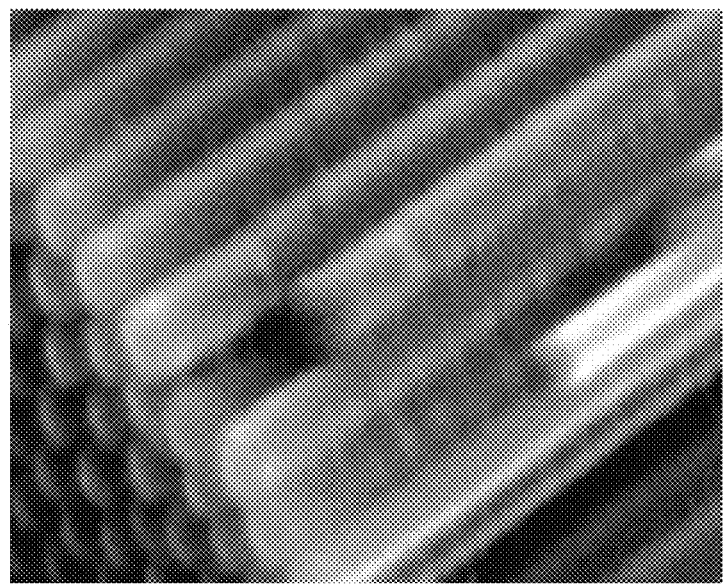
Figure 1D:
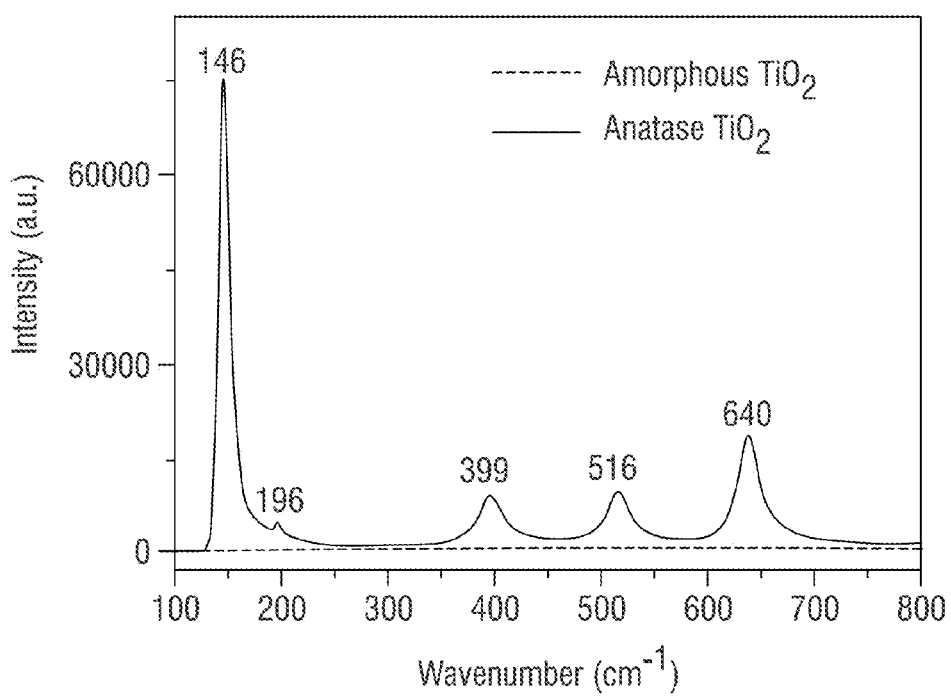

Highly ordered TiO$_2$ nanotube arrays according to one aspect of the invention were fabricated as hereinbefore described. The SEM images of as-prepared TiO2 nanotube arrays are shown in FIGS. 1(A)-(C). The nanotubes had an average inner diameter of 90 nm and an interpore distance of 120 nm (see FIGS. 1(A) and 1(C)). The membrane thickness can be readily controlled by the anodization time; the cross section of a 14-μm-thick TiO$_2$ membrane obtained after 2 hours of anodization is shown in FIG. 1(B). The TiO$_2$ nanotube arrays with thicknesses of 22 and 29 μm were obtained after 3 and 4 hours of anodization, respectively. The as-prepared TiO$_2$ nanotubes were amorphous. To take advantage of nanotubular structures for use in solar cells, they should be converted to crystalline forms, i.e., anatase or rutile phase. The crystalline phase, induced by thermal annealing at 500° C. in air for 3 hours, was confirmed by Raman spectroscopy. A broad spectrum was seen on amorphous TiO$_2$ nanotubes. By contrast, specific Raman peaks at 145, 196, 399, 516, and 640 cm$^{-1}$ were observed from annealed TiO$_2$ nanotube arrays, signifying the formation of anatase TiO$_2$ (see FIG. 1($d$)). The TiO$_2$ nanotubular structures were maintained after high-temperature annealing.

Figure 2:
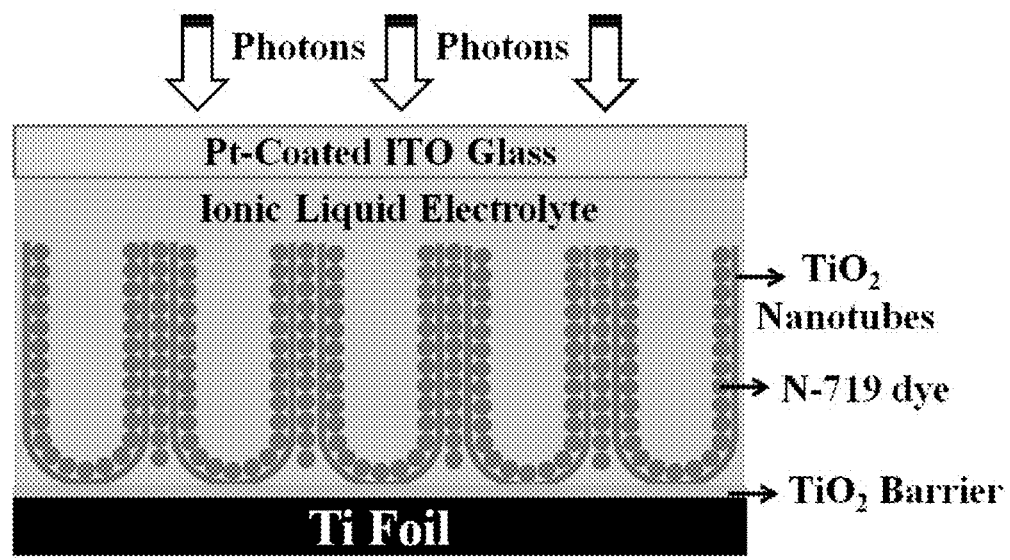
FIG. 2 shows a schematic for an exemplary configuration of a dye-sensitized $TiO_2$ nanotube solar cell.

Anatase TiO$_2$ nanotube arrays were then utilized as photoanodes to assemble dye-sensitized nanostructured solar cells (see FIG. 2). Prior to dye adsorption, the nanotubes were processed with TiCl$_4$ using 0.2 M TiCl$_4$ aqueous solution. Subsequently, the TiCl$_4$ treated TiO$_2$ nanotube arrays were exposed to O$_2$ plasma for different time. The N-719 dye-sensitized TiO$_2$ nanotube solar cells were assembled and the performance was measured.

Figure 3:
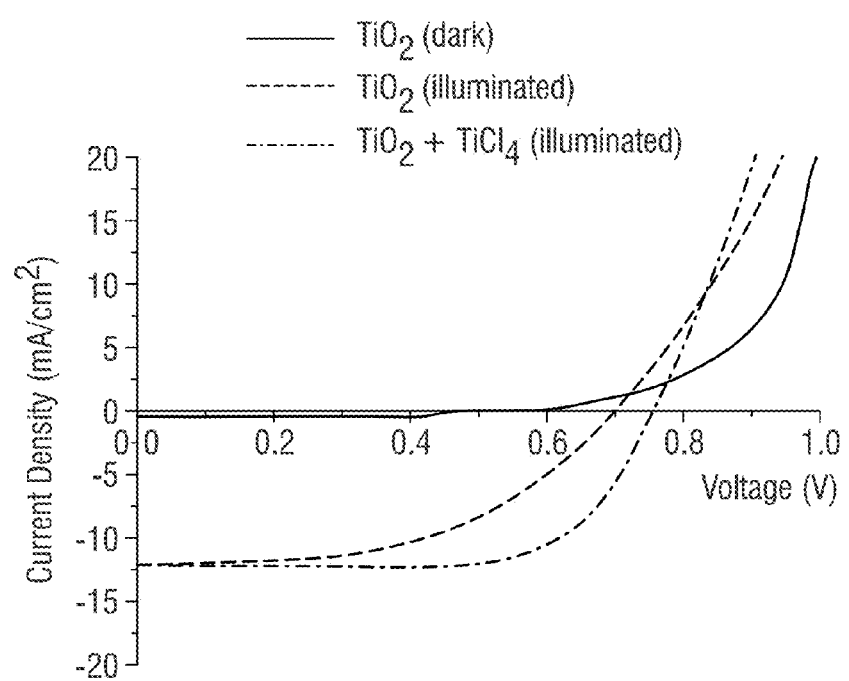
FIG. 3 is a plot of current versus voltage characteristics of a dye-sensitized $TiO_2$ nanotube solar cell.

FIG. 3 shows the effects of TiCl$_4$ treatment on the I-V characteristics of dye-sensitized TiO$_2$ nanotube solar cells. The thickness of TiO$_2$ nanotube arrays was 14 μm. For a solar cell without subjecting to TiCl$_4$ processing, the measurement yielded an open circuit voltage ($V_{OC}$) of 0.70 V, a short circuit current density ($J_{SC}$) of 12.16 mA/cm$^2$, and a fill factor (FF) of 0.51; thus, the power conversion efficiency (PCE), which is defined as $$PCE = \frac{I_{SC} V_{OC} FF}{P_{inc}}$$

is 4.34% (see solid line in FIG. 3). In contrast, when TiCl$_4$-treated TiO$_2$ nanotube arrays were used, the performance sharply increased, yielding values of $V_{OC}$=0.75 V, $J_{SC}$=12.48 mA/cm$^2$, FF=0.68, and PCE=6.36% (see dash-dotted line in FIG. 3), which represents a 47% increase in PCE, when compared to its non-TiCl$_4$ treated counterpart (see dashed line in FIG. 3). The performance improvement is described as follows. Upon high-temperature annealing, there existed structural defects and cracks on the nanotubes, as well as on the barrier layer (i.e., structural disorders), which made it possible for the electrolyte to have direct contact with the Ti electrode on the bottom, leading to decreased shunt resistance and higher chance for charge recombination. By contrast, with TiCl$_4$ treatment, a thin blocking layer of TiO$_2$ can be formed on the uncovered region of Ti foil, thus reducing or eliminating the structural disorders. As a consequence, the shunt resistance increased and series resistance decreased; this improved the FF value, and, ultimately, a higher PCE is obtained. With TiCl$_4$ treatment, the increased electron transport through a TiO$_2$ nanotube wall to the bottom Ti electrode by decreasing the surface charge recombination and the increased dye adsorption by facilitating improved bonding between TiO$_2$ and dye molecules provided enhanced performance.

$O_2$ plasma treatment is demonstrated as one approach to saturate the metal oxide surface with a hydroxyl group, which increases the hydrophilicity at the metal oxide surface. In this regard, to further improve the performance of dye-sensitized nanostructured solar cells, $O_2$ plasma exposure is performed on the $TiCl_4$ treated $TiO_2$ nanotubes prior to infiltration of dye N-719. Specifically, the aforementioned $TiCl_4$ treated, 14-µm-thick $TiO_2$ nanotube arrays were placed in $O_2$ plasma cleaner (Harrick Plasma Model PDC-001; a PlasmaFlo gas meter was used to control the $O_2$ flow in the reaction chamber). The plasma condition was optimized by tuning the $O_2$ flow and vacuum until the brightest fluorescence was observed, i.e., with the $O_2$ flow of 1 SCFH and a vacuum of 500 mTorr. After plasma exposure for different periods of time, $TiO_2$ nanotubes were immersed in the 0.2 mM N-719/ethanol solution for 24 hours. All other steps for the construction of solar cells and the performance measurements were the same. The I-V curves of resulting solar cells are shown in FIG. 4(A)-(D). In comparison to the dash-dotted line in FIG. 3, in which $TiO_2$ nanotubes were not subjected to $O_2$ plasma (PCE=6.36%), the PCE increased to 6.48% after 1 min $O_2$ plasma treatment. With longer time exposure to $O_2$ plasma, the PCE increased; the highest PCE value of 7.37% was achieved from the 10-min $O_2$ plasma-treated sample (see Table 1 below for complete device characterization). The enhancement in PCE can be attributed to a large increase in the photocurrent density ($J_{SC}$), while the photovoltage ($V_{OC}$) experienced little change and the fill factor (FF) slightly decreased. Upon $O_2$ plasma treatment, the hydroxyl group on the $TiO_2$ surface increased and eventually saturated; this promoted the adsorption of the N-719 dye by forming interfacial bonding between N-719 and the $TiO_2$ via the coupling reaction of terminal carboxylic acid groups on N-791 with complementary hydroxyl groups on the $TiO_2$ surface, thereby substantially regulating the interfacial charge transfer from N-719 dye to $TiO_2$ and, therefore, the ultimate photophysical properties at the nanoscale.

Figure 4A:
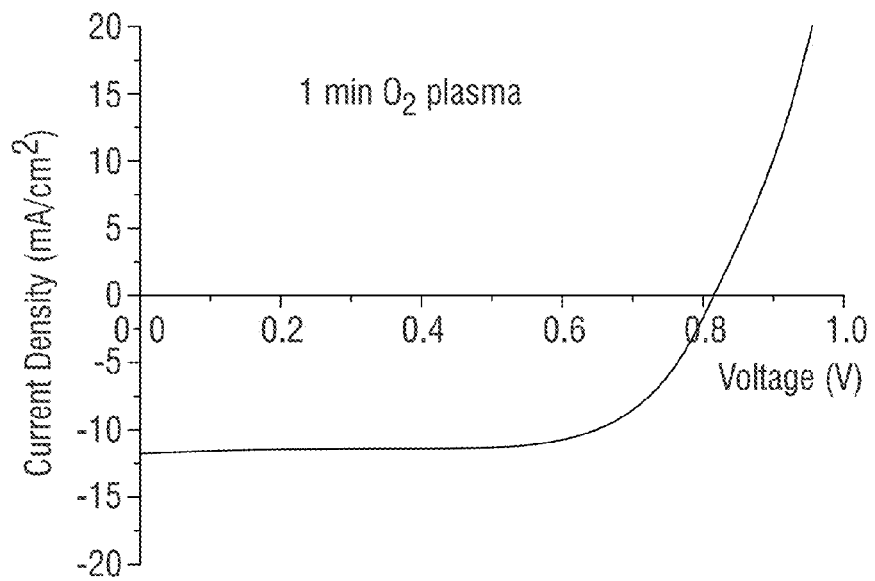
FIGS. 4(A)-(D) show a plot of current versus voltage characteristics of a dye-sensitized $TiO_2$ nanotube solar cell assembled with $TiCl_4$ treatment for different intervals of oxygen plasma exposure.
Figure 4B:
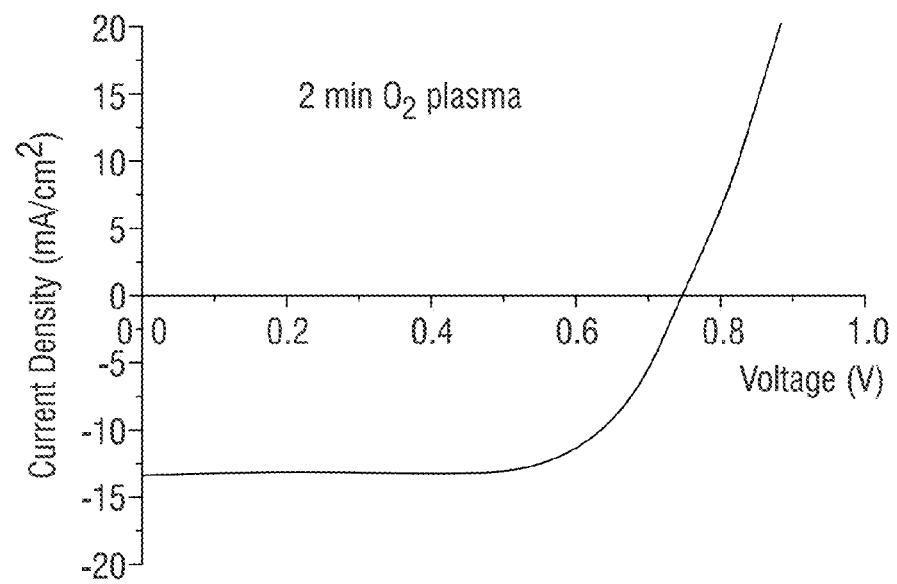
Figure 4C:
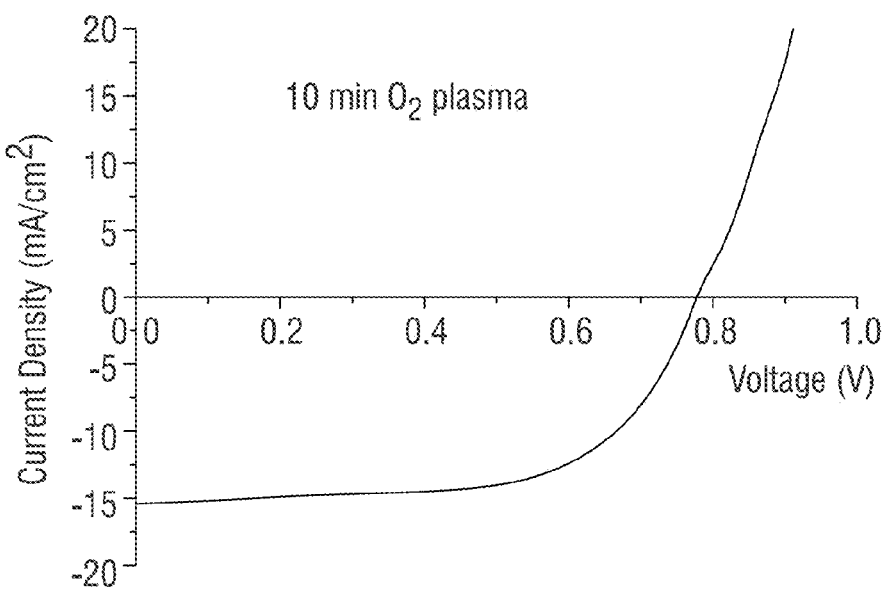
Figure 4D:
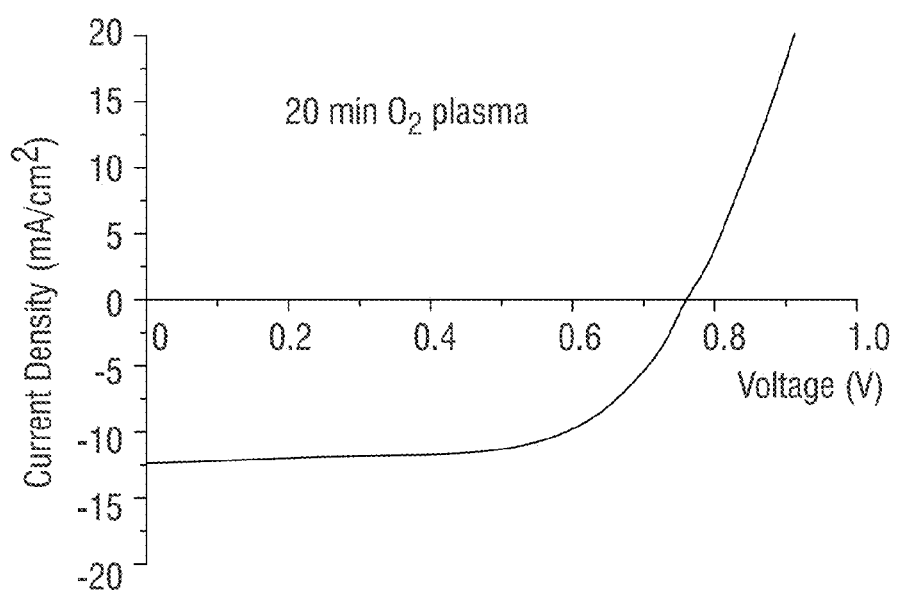

Note that, upon lengthy $O_2$ plasma exposure (e.g., 20 min; see FIG. 4(D) and Table 1), the device performance decreased, exhibiting a largely reduced $J_{SC}$ value, compared to the sample after 10 min of $O_2$ plasma exposure (see FIG. 4(D) and Table 1). This may be because the $TiO_2$ surface became less hydrophilic after a longer-time plasma exposure than that under the optimized condition. Consequently, the dye loading was reduced, which in turn resulted in decreased device performance. Similar trends were seen in solar cells assembled using 22- and 29-µm-hick $TiO_2$ nanotube arrays, that is, the PCE increased with exposure time when nanotubes were subjected to $O_2$ plasma for less than 10 min; otherwise, the PCE was reduced (see Table 1).

Figure 5A:
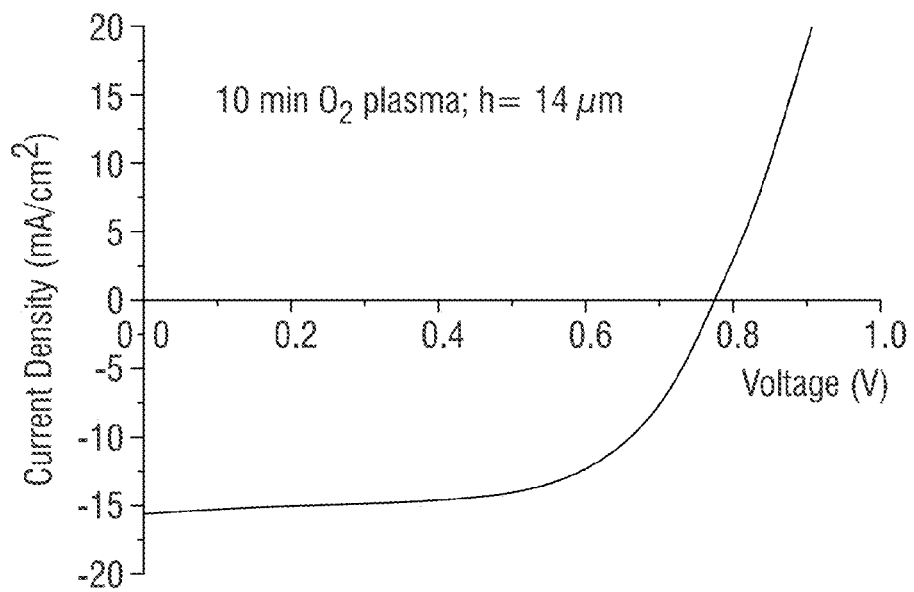
FIGS. 5(A)-(C) show a plot illustrating the effect of the thickness on the current versus voltage characteristics for a dye-sensitized $TiO_2$ nanotube for different intervals of oxygen plasma exposure.
Figure 5B:
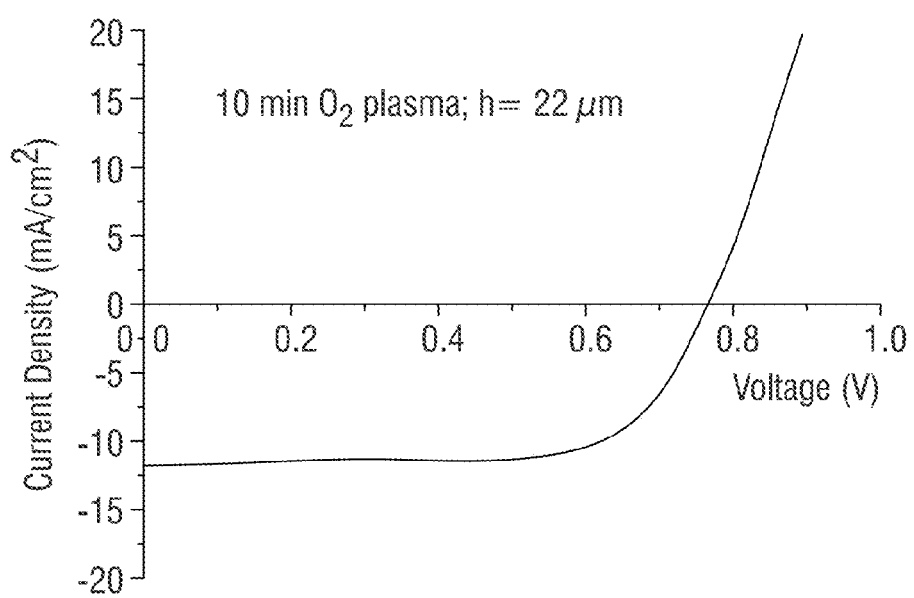
Figure 5C:
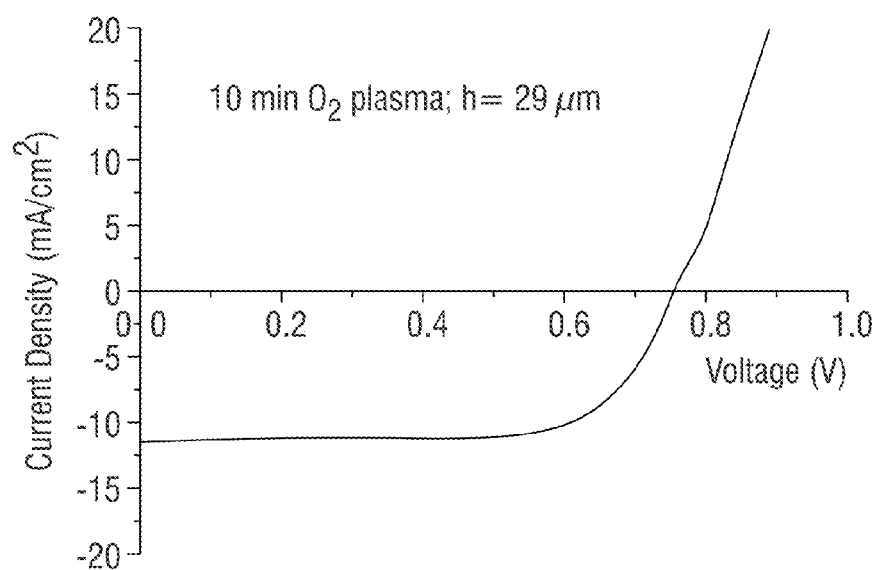

The present invention contemplates increasing the thickness of $TiO_2$ nanotube arrays to improve the performance of solar cells by allowing more dye molecules to be adsorbed on the $TiO_2$ nanotube surface, thereby obtaining a higher light harvesting efficiency. To this end, thicker $TiO_2$ nanotube arrays 22 and 29 µm in thickness were prepared and used to fabricate solar cells; they were processed with $TiCl_4$ and oxygen plasma. The use of thicker $TiO_2$ nanotube arrays yielded progressively decreased performance (PCE=6.29% for 22-µm-thick nanotubes and PCE=6.05% for 29-µm thick nanotubes; see Table 1) compared to the device produced using 14-µm-thick nanotubes (PCE=7.37%). The I-V characteristics of solar cells assembled using 14-, 22-, and 29-µm-thick $TiO_2$ nanotubes are shown in FIGS. 5(A), 5(B), and 5(C), respectively. For the 22-µm-thick $TiO_2$ nanotube arrays, although the device performance increased as a function of $O_2$ plasma exposure time (see Table 1), the PCE value was less than that using 14-µm-thick $TiO_2$ nanotubes. When even thicker $TiO_2$ nanotube arrays were used (i.e., 29 µm), the PCE value decreased further. The decrease in PCE with increased $TiO_2$ thickness may be due to the limitations of the current device configuration, as depicted in FIG. 2. In the backside illumination mode, the incident photons had to pass through semitransparent platinum-coated ITO glass and the ionic liquid electrolyte (i.e., ES-0004). Thus, a portion of incident photons were lost before reaching the sensitizer N-719 dye and the photoanode $TiO_2$ nanotube arrays. Therefore, as the thickness of nanotubes increased, the remaining photons may be fully absorbed by the dyes that were anchored on the top part of $TiO_2$ nanotube; however, the dyes on the bottom part of nanotubes are not excited. Accordingly, the present invention contemplates the use of freestanding $TiO_2$ nanotube arrays (i.e., detached from Ti foil after anodization) or $TiO_2$ nanotubes directly grown on transparent conductive substrate in a front-side illumination mode, where the dye-adsorbed $TiO_2$ nanotube arrays are directly illuminated from the $TiO_2$ nanotube arrays before incident photons encounter the electrolyte and the counter electrode, thereby ensuring good light harvesting efficiency.

TABLE 1

Summary of the Device Performance of Dye-Sensitized $TiO_2$ Nanotube Solar Cells

| $TiCl_4$ | $O_2$ plasma exposure time (min) | Open circuit voltage, $V_{OC}$ (V) | Short-circuit current density, $J_{SC}$ (mA/CM$^2$) | Fill factor, FF | Power conversion efficiency, PCE (%) |
|---|---|---|---|---|---|
| $TiO_2$ Nanotube Thickness = 14 µm | | | | | |
| no | 0 | 0.70 | 12.16 | 0.51 | 4.34 |
| yes | 0 | 0.75 | 12.48 | 0.68 | 6.36 |
| yes | 1 | 0.81 | 11.76 | 0.68 | 6.48 |
| yes | 2 | 0.74 | 13.36 | 0.68 | 6.72 |
| yes | 10 | 0.77 | 15.44 | 0.62 | 7.37 |
| yes | 20 | 0.76 | 12.45 | 0.62 | 5.87 |
| $TiO_2$ Nanotube Thickness = 22 µm | | | | | |
| yes | 0 | 0.73 | 8.10 | 0.63 | 3.73 |
| yes | 1 | 0.67 | 8.48 | 0.67 | 3.81 |
| yes | 2 | 0.75 | 9.30 | 0.69 | 4.29 |
| yes | 5 | 0.72 | 9.2 | 0.71 | 4.70 |
| yes | 10 | 0.77 | 11.84 | 0.69 | 6.29 |
| yes | 20 | 0.72 | 9.6 | 0.70 | 4.84 |
| $TiO_2$ Nanotube Thickness = 29 µm | | | | | |
| yes | 10 | 0.75 | 11.52 | 0.70 | 6.05 |

As can be seen from the examples of the present invention, the Applicants have assembled ruthenium dye (N-719)-sensitized nanostructured solar cells, using highly ordered anodic $TiO_2$ nanotube arrays as the photoanode. Rational surface engineering on $TiO_2$ nanotubes with $TiCl_4$ treatment together with $O_2$ plasma activation under optimized condition dramatically enhanced the performance of resulting devices. A solar cell in backside illumination mode produced using 14-µm-thick $TiO_2$ nanotube arrays after surface treatments with $TiCl_4$ and $O_2$ plasma yielded a power conversion efficiency (PCE) of 7.37%, which is the highest promising efficiency for solar cells made of $TiO_2$ nanotube arrays reported in the literature. In addition to ruthenium-based organic dyes, in principle, the invention contemplates that conjugated homopolymers (e.g., regioregular poly(3-hexyl thiophene)), conjugated block copolymers, and semiconducting nanocrystals (e.g., quantum dots) can be employed as alternative photosensitizers to create a variety of dye-sensitized $TiO_2$ nanotube solar cells.

As can be seen from the above specification and illustrative examples, the invention accomplishes at least its primary objective, but its limitation is based upon the claims which follow.

REFERENCES

The reference listed below, is herein incorporated by reference in its entirety.

J. Wang and Z. Lin, "Dye sensitized TiO2 nanotube solar cell with markedly enhanced performance via rational surface engineering", Chemistry of Materials 22, 579-584 (2010) (Featured on the Cover of Chemistry of Materials).

What is claimed is:

1. In the process of forming dye sensitized solar cells from semiconductor anode via electrochemical anodization and application of a molecular sensitizer and an electrolyte, the improvement comprising:
   improving the power conversion efficiency of the dye sensitized solar cell with a facile surface treatment by $TiCl_4$ and a plasma exposed to the surface.

2. The process of claim 1 wherein the dye sensitized solar cell is selected from the group consisting of dye sensitized $TiO_2$ nanotube solar cells, quantum dots sensitized solar cells, organic hybrid solar cells and inorganic hybrid solar cells.

3. The process of claim 2 wherein the dye sensitized solar cell is a $TiO_2$ nanotube solar cell.

4. The process of claim 1 wherein the semiconductor anode is thin layer of $TiO_2$ deposited from an aqueous solution of $TiCl_4$.

5. The process of claim 4 wherein the molarity of the $TiCl_4$ is 0.2 M.

6. The process of claim 1 wherein the semiconductor anode is $TiO_2$ or ZnO.

7. The process of claim 1 wherein the molecular sensitizer is selected from the group consisting of organic dyes, conjugated homopolymers, conjugated block copolymers, and semiconducting nanocrystals.

8. The process of claim 1 wherein the molecular sensitizer is a ruthenium-based organic dye.

9. The process of claim 8 wherein the ruthenium-based organic dye is cis-diisothiocyanato-bis(2,2'-bipyridyl-4,4'-dicarboxylato) ruthenium(II) bis(tetrabutylammonium).

10. The process of claim 1 wherein the plasma is $O_2$ plasma.

11. The process of claim 1 wherein the electrolyte is an ionic liquid electrolyte.

12. A process for forming dye sensitized solar cells from a semi-conductor anode by electrochemical anodization comprising:
    forming a nanotube array from a semiconductor anode;
    facile surface treating the array with $TiCl_4$; and
    exposing the treated surface of the array to $O_2$ plasma to increase hydroxyl groups on the surface.

13. The process of claim 12 further comprising absorbing a ruthenium-based organic dye in the surface.

14. The process of claim 12 wherein the semiconductor anode is $TiO_2$.

15. The process of claim 12 wherein exposure of the $O_2$ plasma is less than 10 minutes.

16. The process of claim 12 further comprising absorbing a molecular sensitizer onto the surface by forming interfacial bonding via coupling reaction of terminal carboxylic acid groups with the hydroxyl groups.

17. The process of claim 12 wherein the semiconductor anode is ZnO.

* * * * *